(12) United States Patent
Boudet et al.

(10) Patent No.: US 8,609,800 B2
(45) Date of Patent: Dec. 17, 2013

(54) CURABLE COMPOSITIONS CONTAINING SILYLATED POLYURETHANES

(75) Inventors: Helene Boudet, Duesseldorf (DE); Andreas Bolte, Duesseldorf (DE); Thomas Bachon, Duesseldorf (DE); Lars Zander, Rommerskirchen (DE); Christiane Kunze, Cologne (DE); Johann Klein, Duesseldorf (DE); Nicole Ditges, Soligen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 481 days.

(21) Appl. No.: 12/906,397

(22) Filed: Oct. 18, 2010

(65) Prior Publication Data

US 2011/0034627 A1 Feb. 10, 2011

Related U.S. Application Data

(63) Continuation of application No. PCT/CT2009/054941, filed on Apr. 24, 2009.

(30) Foreign Application Priority Data

Apr. 25, 2008 (DE) .......................... 10 2008 020 979

(51) Int. Cl.
*C08G 18/83* (2006.01)
(52) U.S. Cl.
USPC ................... 528/28; 528/44; 528/59; 528/65; 528/85; 556/413; 556/419; 556/420; 556/436; 556/437; 556/449; 556/482
(58) Field of Classification Search
None
See application file for complete search history.

(56) References Cited

U.S. PATENT DOCUMENTS

| | | | |
|---|---|---|---|
| 3,632,557 A | 1/1972 | Brode et al. | |
| 3,971,751 A | 7/1976 | Isayama et al. | |
| 3,979,344 A | 9/1976 | Bryant et al. | |
| 4,222,925 A | 9/1980 | Bryant et al. | |
| 4,960,844 A | 10/1990 | Singh | |
| 5,525,654 A | 6/1996 | Podola et al. | |
| 5,866,651 A * | 2/1999 | Moren et al. | 524/588 |
| 5,990,257 A | 11/1999 | Johnston et al. | |
| 6,124,387 A | 9/2000 | Wang et al. | |
| 6,545,087 B1 | 4/2003 | Schmalstieg et al. | |
| 2005/0272835 A1 * | 12/2005 | Iwakiri et al. | 523/218 |
| 2006/0122338 A1 * | 6/2006 | Roesler et al. | 525/453 |
| 2007/0299242 A1 * | 12/2007 | Faecke et al. | 528/415 |

FOREIGN PATENT DOCUMENTS

| | | |
|---|---|---|
| DE | 4029504 | 3/1992 |
| DE | 69601634 | 5/1996 |
| DE | 19849817 | 5/2000 |
| EP | 70475 | 10/1986 |
| EP | 283 148 A2 * | 8/1988 |
| EP | 0370464 | 5/1990 |
| EP | 0520426 | 12/1992 |
| EP | 601021 | 6/1994 |
| EP | 0931800 | 7/1999 |
| EP | 1396513 | 3/2004 |
| WO | WO 9205212 | 4/1992 |
| WO | WO 9305089 | 3/1993 |
| WO | WO 9638453 | 12/1996 |
| WO | WO 9818844 | 5/1998 |
| WO | WO 03066701 | 8/2003 |
| WO | WO 2005042605 | 5/2005 |
| WO | WO 2005042610 | 5/2005 |

OTHER PUBLICATIONS

International Search Report for International Patent Application No. PCT/EP2009/054941 mailed Apr. 9, 2009.

* cited by examiner

*Primary Examiner* — Marc Zimmer
(74) *Attorney, Agent, or Firm* — James E. Piotrowski; Steven C. Bauman

(57) ABSTRACT

Silylated polyurethanes can be manufactured by reacting at least one polyol compound, having a molecular weight from 4000 to 20,000 dalton, with a diisocyanate, with a stoichiometric excess of the diisocyanate compound with respect to the polyol compound or compounds, with the result that a polyurethane prepolymer that is isocyanate-terminated is formed; and by subsequently reacting the polyurethane prepolymer with one or more OH-terminated silanes of formula (1) to yield a polyurethane having predominantly terminal alkoxysilyl groups. In formula (1), m is equal to 0, 1, or 2, $R^1$ is an alkyl residue having 1 to 4 carbon atoms, $R^2$ is an alkyl residue having 1 to 4 carbon atoms, $R^3$ is a divalent organic residue having 1 to 12 atoms, selected from C, N, S, and/or O, in the chain, but by preference exclusively carbon atoms, $R^4$ is a hydrogen atom or an alkyl residue having 1 to 10 carbon atoms, and R is a difunctional organic group, preferably a linear or branched alkyl group having 1 to 6 carbon atoms. The silylated polyurethanes are suitable for use in a preparation as an adhesive, sealant, or coating agent.

19 Claims, No Drawings

CURABLE COMPOSITIONS CONTAINING SILYLATED POLYURETHANES

This application is a continuation under 35 U.S.C. Sections 365(c) and 120 of International Application No. PCT/EP2009/054941, filed Apr. 24, 2009 and published on Oct. 29, 2009 as WO 2009/130298, which claims priority from German Patent Application No. 102008020979.1 filed Apr. 25, 2008, which are incorporated herein by reference in their entirety.

The present invention relates to silane-crosslinking curable compositions based on reaction products of isocyanate-functional prepolymers and hydroxyfunctional silane compounds, and to their manufacture and their use in adhesives and sealants and in coating agents.

Polymer systems that possess reactive alkoxysilyl groups are known. In the presence of atmospheric moisture these alkoxysilane-terminated polymers are capable, already at room temperature, of condensing with one another with release of the alkoxy groups. What forms in this context, depending on the concentration of alkoxysilyl groups and their configuration, are principally long-chain polymers (thermoplastics), relatively wide-mesh three-dimensional networks (elastomers), or highly crosslinked systems (thermosetting plastics).

The polymers generally comprise an organic backbone that carries alkoxysilyl groups at the ends. The organic backbone can involve, for example, polyurethanes, polyesters, polyethers, etc.

One-component, moisture-curing adhesives and sealants have for years played a significant role in numerous technical applications. In addition to the polyurethane adhesives and sealants having free isocyanate groups, and the traditional silicone adhesives and sealants based on dimethylpolysiloxanes, the so-called modified silane adhesives and sealants have also been increasingly used recently. In this latter group, the main constituent of the polymer backbone is a polyether, and the reactive and crosslinkable terminal groups are alkoxysilyl groups. The modified silane adhesives and sealants have the advantage, as compared with the polyurethane adhesives and sealants, of being free of isocyanate groups, in particular of monomeric diisocyanates; they are also notable for a broad adhesion spectrum to a plurality of substrates without surface pretreatment using primers.

U.S. Pat. No. 4,222,925 A and U.S. Pat. No. 3,979,344 A describe siloxane-terminated organic sealant compositions, curable already at room temperature, based on reaction products of isocyanate-terminated polyurethane prepolymers with 3-aminopropyltrimethoxysilane or 2-aminoethyl- or 3-aminopropylmethoxysilane to yield isocyanate-free siloxane-terminated prepolymers. Adhesives and sealants based on these prepolymers have unsatisfactory mechanical properties, however, especially in terms of their elongation and breaking strength.

The methods set forth below for the manufacture of silane-terminated prepolymers based on polyethers have already been described:

Copolymerization of unsaturated monomers with ones that comprise alkoxysilyl groups, for example vinyltrimethoxysilane.

Grafting unsaturated monomers, such as vinyltrimethoxysilane, onto thermoplastics such as polyethylene.

Hydroxyfunctional polyethers are converted in an ether synthesis, using unsaturated chlorine compounds, e.g. allyl chloride, into polyethers having terminal olefinic double bounds, which in turn are reacted with hydrosilane compounds that have hydrolyzable groups, for example $HSi(OCH_3)_3$, in a hydrosilylation reaction under the catalytic influence of, for example, transition metal compounds of the eighth group, to yield silane-terminated polyethers.

In another method, the polyethers containing olefinically unsaturated groups are reacted with a mercaptosilane such as, for example, 3-mercaptopropyltrialkoxysilane.

In a further method, firstly hydroxyl-group-containing polyethers are reacted with di- or polyisocyanates, which are then in turn reacted with aminofunctional silanes or mercaptofunctional silanes to yield silane-terminated prepolymers.

A further possibility provides for the reaction of hydroxyfunctional polyethers with isocyanatofunctional silanes such as, for example, 3-isocyanatopropyltrimethoxysilane.

These manufacturing methods, and the use of the aforementioned silane-terminated prepolymers in adhesive/sealant applications, are recited e.g. in the following patent documents: U.S. Pat. No. 3,971,751 A, EP-A-70475, DE-A-19849817, U.S. Pat. No. 6,124,387 A, U.S. Pat. No. 5,990,257 A, U.S. Pat. No. 4,960,844 A, U.S. Pat. No. 3,979,344 A, U.S. Pat. No. 3,632,557 A, DE-A-4029504, EP-A-601021, or EP-A-370464.

EP-A-0931800 describes the manufacture of silylated polyurethanes by reacting a polyol component having a terminal unsaturation of less than 0.02 meq/g with a diisocyanate to yield a hydroxyl-terminated prepolymer, and then reacting that with an isocyanatosilane of the formula OCN—R—Si—$(X)_m$(—$OR^1$)$_{3-m}$, where m is 0, 1, or 2 and each $R^1$ residue is an alkyl group having 1 to 4 carbon atoms and R is a difunctional organic group. According to the teaching of this document, such silylated polyurethanes exhibit a superior combination of mechanical properties, and cure in reasonable amounts of time to yield a low-tack sealant without exhibiting excessive viscosity.

WO-A-2003 066701 discloses polyurethane prepolymers, comprising alkoxysilane terminal groups and OH terminal groups, based on high-molecular-weight polyurethane prepolymers with decreased functionality, for use as binding agents for low-modulus sealants and adhesives. For this, firstly a polyurethane polymer, made up of a diisocyanate component having an NCO content from 20 to 60% with a polyol component encompassing a polyoxyalkylene diol having a molecular weight between 3000 and 20,000 as a main component, is to be reacted, the reaction to be stopped at a 50 to 90% OH group conversion yield. This reaction product is then to be further reacted with a compound comprising alkoxysilane groups and amino groups. These actions are said to yield prepolymers having a comparatively low average molecular weight and low viscosity, which are said to ensure that a high level of properties is obtained.

WO-A-96/38453 describes moisture-curing alkoxysilane-functional polyurethanes manufactured from a hydroxyfunctional alkoxysilane, in particular a hydroxyalkylenecarbamoylalkylene alkoxysilane, and an isocyanate-functional polyurethane prepolymer. According to the teaching of this document, the alkoxysilane-functional polyurethanes can be used for application in moisture-curing adhesives, sealants, and similar preparations.

In similar fashion, U.S. Pat. No. 5,866,651 A discloses moisture-curing sealant compositions based on polyether urethanes manufactured from hydroxyalkylenecarbamoylalkylene alkoxysilanes. According to the teaching of this document, the polyether segments are to comprise more than 15 mol % and less than 40 mol % ethylene oxide units; the polyether segments are to have a number-average molecular weight between 2000 and 8000, the ethylene oxide units preferably being arranged at the ends of the propylene oxide units.

WO-A-2005 042605 discloses moisture-curing alkoxysilane-functional polyether urethane compositions that contain 20 to 90 wt % of a polyether urethane A having two or more reactive silane groups, and 10 to 80 wt % of a polyether urethane B having one reactive silane group. Polyether urethane A is said to comprise polyether segments having a number-average molecular weight ($M_n$) of at least 3000 and an unsaturation of less than 0.04 meq/g, and the reactive silane groups are to be inserted by reaction of an isocyanate-reactive group with a compound of the formula OCN—Y—Si—(X)$_3$. Polyether urethane B is to comprise one or more polyether segments having a number-average molecular weight ($M_n$) from 1000 to 15,000, and the reactive silane groups are to be inserted by reacting an isocyanate group with a compound of the formula HN($R_1$)—Y—Si—(X)$_3$. $R_1$ here is an alkyl, cycloalkyl, or aromatic group having 1 to 12 carbon atoms, X an alkoxy group, and Y a linear radical having 2 to 4 carbon atoms or a branched radical having 5 to 6 carbon atoms.

To reduce the functionality, and thus the crosslinking density, of moisture-curing alkoxysilane-terminated polyurethanes, WO-A-92/05212 proposes the concurrent use of monofunctional isocyanates mixed with diisocyanates in the context of synthesis. Monoisocyanates are known to have a very high vapor pressure, and are objectionable ingredients in terms of industrial hygiene because of their toxicity.

EP-A-1396513 describes a composition that cures at room temperature and contains a polyoxyalkylene polymer (A), having a molecular weight from 8000 to 50,000 (calculated from the hydroxyl number), that comprises hydrolyzable silicon groups of the formula —Si$X_a R^1_{3-a}$, in which X is a hydroxyl group or a hydrolyzable group, a is 1, 2, or 3, and $R^1$ is a $C_{1-20}$-substituted or unsubstituted monovalent organic group. The composition is to contain both polyoxyalkylene polymers (A) in which a is 1 or 2, and ones in which a is 3. If more than one $R^1$ is present, the majority of $R^1$ can be the same or different; and if more than one X is present, the majority of X can be the same or different. The composition that cures at room temperature is to be usable as a sealing compound, impregnation agent, adhesive, or coating agent.

A need still exists for isocyanate-free compositions for the manufacture of one- or two-component adhesives and sealants that exhibit an acceptable curing time and particularly good elasticity and extensibility after curing. A desire also exists for an efficient synthesis route, and for compositions that exhibit no residual tackiness.

The object of the present invention is therefore to make available isocyanate-free crosslinkable compositions that exhibit high elasticity and good strength with a very low modulus of elasticity. A user-friendly curing time is also desired.

The manner in which the object is achieved by the invention may be gathered from the Claims. It involves substantially making available a method for manufacturing a silylated polyurethane, encompassing reacting
  (i) at least one polyol compound, having a molecular weight from 4000 to 20,000 dalton, with
  (ii) a diisocyanate, with a stoichiometric excess of the diisocyanate compound with respect to the polyol compound or compounds or with respect to the OH groups of the polyol compound or compounds, with the result that a polyurethane prepolymer that is isocyanate-terminated is formed; and subsequently reacting the polyurethane prepolymer with one or more OH-terminated silanes of formula (1);

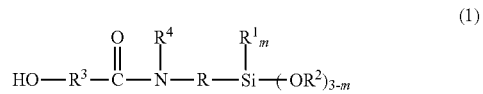

(1)

to yield a polyurethane having predominantly terminal alkoxysilyl groups.

In formula (I), m is equal to 0, 1, or 2, $R^1$ is an alkyl residue having 1 to 4 carbon atoms, $R^2$ is an alkyl residue having 1 to 4 carbon atoms, $R^3$ is a divalent organic residue having 1 to 12, preferably 1 to 10 atoms, selected from C, N, S, and/or O, in the chain, $R^4$ is a hydrogen atom or an alkyl residue having 1 to 10 carbon atoms, and R is a difunctional organic group, by preference a linear or branched alkylene group having 1 to 6 carbon atoms.

In preferred embodiments, $R^3$ has the following structural elements (2):

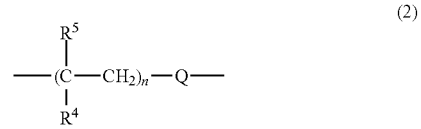

(2)

wherein n is a whole number between 1 and 6,
Q is N, O, S, a covalent bond, or $NR^4$, and
$R^4$ and $R^5$ can be, mutually independently, a hydrogen atom or an alkyl residue having 1 to 10 carbon atoms.

The invention also relates to a polyurethane having alkoxysilane end groups which is manufactured by reacting at least one polyol compound, having a molecular weight from 4000 to 20,000 daltons, with a diisocyanate, with a stoichiometric excess of the diisocyanate compound with respect to the OH groups of the polyol compound or compounds, to yield an isocyanate-terminated polyurethane prepolymer that, in a subsequent reaction, is reacted with one or more OH-terminated silanes of formula (1), with the result that a silylated polyurethane is formed which comprises alkoxysilyl groups as reactive end groups.

A further subject of the present invention is a moisture-curing adhesive, sealant, or coating preparation and use thereof, which contains one or more silylated polyurethane(s) of the aforesaid kind. In addition to the silylated polyurethanes according to the present invention, this preparation can also contain plasticizers, fillers, catalysts, and further adjuvants and additives.

In a further preferred embodiment of the present invention, R in formula (1) is a difunctional straight or branched alkylene residue having 2 to 6 carbon atoms.

In a further preferred embodiment of the present invention, m in formula (1) is zero or one, i.e. the silylated polyurethane contains tri- or dialkoxylsilyl groups. The particular advantage of dialkoxysilyl groups is that the corresponding compositions are, after curing, softer and more elastic than systems containing trialkoxysilyl groups. They are therefore particularly suitable for utilization as sealants. In addition, they release less alcohol upon curing, and thus offer an application advantage from a physiological standpoint as well. With trialkoxysilyl groups, on the other hand, a higher degree of crosslinking can be achieved, which is particularly advantageous if a hard, solid substance is desired after curing.

Trialkoxysilyl groups are moreover more reactive, i.e. crosslink more quickly, and thus decrease the quantity of catalyst required, and they have advantages in terms of "cold flow."

In principle, a large number of polymers carrying at least two hydroxyl groups can be used as polyol compounds and thus as the principal constituent of the polymer backbone of the silylated polyurethanes according to the present invention; examples that may be recited are polyester polyols, hydroxyl-group-containing polycaprolactones, hydroxyl-group-containing polybutadienes or polyisoprenes as well as hydrogenation products thereof, or also hydroxyl-group-containing polyacrylates or polymethacrylates.

Polyalkylene glycols, however, in particular polyethylene oxides and/or polypropylene oxides, are very particularly preferred as polyols.

Polyols that contain polyethers as a polymer backbone exhibit a flexible and elastic structure not only at the end groups but also in the polymer spine. Compositions that once again exhibit outstanding elastic properties can be manufactured therewith. Polyethers are not only flexible in their framework, but also at the same time strong. For example, polyethers (in contrast to e.g. polyesters) are not attacked or decomposed by water and bacteria.

According to a further preferred embodiment of the composition according to the present invention, the molecular weight $M_n$ of the polymer backbone of the polyol compounds is between 4000 and 20,000 g/mol (daltons), particularly preferably between 8000 and 19,000 daltons, and in particular between 12,000 and 18,000 daltons, the terminal unsaturation being less than 0.05 meq/g, preferably less than 0.04 meq/g, and very particularly preferably less than 0.02 meq/g.

These molecular weights are particularly advantageous because these polyols are readily available commercially.

Polyoxyalkylenes, in particular polyethylene oxides or polypropylene oxides, that have a polydispersity PD of less than 2, preferably less than 1.5, are used with very particular preference.

The "molecular weight $M_n$" is understood as the number-average molecular weight of the polymer. This, like the weight-average molecular weight $M_w$, can be determined by gel permeation chromatography (GPC, also called SEC). This method is known to one skilled in the art. The polydispersity is derived from the average molecular weights $M_w$ and $M_n$. It is calculated as $PD=M_w/M_n$.

Particularly advantageous viscoelastic properties can be achieved if polyoxyalkylene polymers that possess a narrow molecular weight distribution, and thus a low polydispersity, are used as polymer backbones. These can be manufactured, for example, by so-called double metal cyanide (DMC) catalysis. These polyoxyalkylene polymers are notable for a particularly narrow molecular weight distribution, a high average molecular weight, and a very small number of double bonds at the ends of the polymer chains. Silylated polyurethanes that comprise a backbone of this kind, and preparations based thereon, exhibit not only a user-friendly viscosity but also, in particular, outstanding tensile shear strength values.

Such polyoxyalkylene polymers have a polydispersity PD ($M_w/M_n$) of at most 1.7. Particularly preferred organic backbones are, for example, polyethers having a polydispersity from approximately 1.01 to approximately 1.3, in particular approximately 1.05 to approximately 1.18, for example approximately 1.08 to approximately 1.11 or approximately 1.12 to approximately 1.14; their terminal unsaturation is less than 0.05 meq/g, preferably less than 0.04 meq/g, and very particularly preferably less than 0.02 meq/g.

It is particularly preferable to use polyethylene oxides and/or polypropylene oxides, the polyether polymers at the ends preferably comprising propylene oxide units and being difunctional. In a very particularly preferred embodiment of the present invention, polypropylene oxide is used as a polyol compound. Propylene oxide is particularly easily amenable to DMC catalysis, so that this approach yields polyols having relatively high molecular weights along with a high degree of OH functionalization (difunctionality being preferred) and low polydispersity. As has already been stated above, these parameters promote the viscoelastic properties of the silylated polyurethanes according to the present invention.

The following diisocyanates can be used to convert the polyol compound into an isocyanate-terminated polyurethane prepolymer: Ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), and isomer mixtures thereof. Also suitable are partly or completely hydrogenated cycloalkyl derivatives of MDI, for example completely hydrogenated MDI (H12-MDI), alkyl-substituted diphenylmethane diisocyanates, for example mono-, di-, tri-, or tetraalkyldiphenylmethane diisocyanate as well as partially or completely hydrogenated cycloalkyl derivatives thereof, 4,4'-diisocyanatophenylperfluorethane, phthalic acid bisisocyanatoethyl ester, 1-chloromethylphenyl-2,4- or -2,6-diisocyanate, 1-bromomethylphenyl-2,4- or -2,6-diisocyanate, 3,3-bischloromethyl ether-4,4'-diphenyldiisocyanate, sulfur-containing diisocyanates such as those obtainable by reacting 2 mol diisocyanate with 1 mol thiodiglycol or dihydroxyhexylsulfide, the diisocyanates of the dimer fatty acids, or mixtures of two or more of the aforesaid diisocyanates.

Monofunctional compounds can also be concurrently used, if applicable, in the manufacture of the isocyanate-terminated polyurethane prepolymer.

Suitable according to the present invention as monofunctional compounds are those compounds that have groups having a functionality of 1 that are reactive with respect to isocyanates. All monofunctional alcohols, amines, or mercaptans are usable in principle for this; these are, in particular, monofunctional alcohols having up to 36 carbon atoms, monofunctional primary and/or secondary amines having up to 36 carbon atoms, or monofunctional mercaptans having up to 36 carbon atoms. Mixtures of polyalcohols, polyamines, and/or polymercaptans can, however, also be used as monofunctional compounds, provided their average functionality is well below 2.

Particularly preferred, for example, are monoalcohols such as benzyl alcohol, methanol, ethanol, the isomers of propanol, of butanol, and of hexanol, monoethers of ethylene glycol and/or diethylene glycol, and the primary alcohols having 8 to 18 carbon atoms obtainable by reduction of fatty acids, such as octanol, decanol, dodecanol, tetradecanol, hexadecanol, and octadecanol, especially in the form of technical mixtures thereof. Monoalcohols having 4 to 18 carbon atoms are preferred, since the lower alcohols are difficult to manufacture in anhydrous fashion.

Also usable are monoalkylpolyether alcohols of various molecular weights, a number average of the molecular weight of between 1000 and 2000 being preferred. A preferred representative is, for example, monobutylpropylene glycol.

Saturated fatty alcohols having up to 26 carbon atoms can also be used, preferably those having up to 22 carbon atoms that can be synthesized on an industrial scale by reduction (hydrogenation) of fatty acid methyl esters. Examples that may be recited are: hexanol, octanol, pelargonic alcohol, decanol, lauric alcohol, myristic alcohol, cetyl alcohol, stearyl alcohol, gadoleyl alcohol, and behenyl alcohol, or the Guerbet alcohols 2-hexyldecanol, 2-octyldodecanol, 2-decyltetradecanol, 2-dodecylhexadecanol, 2-tetradecyloctadecanol, 2-hexadecyleicosanol, Guerbet alcohol from erucyl alcohol, behenyl alcohol, and ocenois.

If applicable, mixtures resulting from Guerbetization of technical fatty alcohols can be used together with the other aforesaid alcohols.

The proportion of the monofunctional compound(s) is 0 to 40 mol %, based on the polyol mixture; a proportion of monofunctional compound(s) from 15 to 30 mol % is particularly preferred.

The stoichiometric excess of the diisocyanate compound or mixture of diisocyanates with respect to the sum of polyol compounds and monofunctional compound used, or with respect to the OH groups of the sum of polyol compounds and monofunctional compound used, is equal to 1.1 to 2.0; it is preferably between 1.2 and 1.5 This ensures that a polyurethane prepolymer having terminal isocyanate groups is formed as a reaction product.

The polyurethane prepolymer having terminal isocyanate groups that is thereby formed is then reacted with a silane of formula (1) to yield the silylated polyurethane according to the present invention, which comprises alkoxysilyl groups as reactive end groups. This requires that at least one molecule of the silane of formula (1) be used for each isocyanate group of the polyurethane prepolymer having terminal isocyanate groups; by preference, the silane of formula (1) is used at a slight stoichiometric excess.

The silane of formula (1) is preferably manufactured by reacting an aminosilane, having primary or secondary amino groups, with a carbonate selected from ethylene carbonate, propylene carbonate, butylene carbonate, or with a lactone selected from propiolactone, butyrolactone, or caprolactone.

The aminosilane can be selected from 3-aminopropyltrimethoxysilane, 3-aminopropyltriethoxysilane, N-(n-butyl)-3-aminopropyltrimethoxysilane, 3-aminopropylmethyldimethoxysilane, 3-aminopropylmethyldiethoxysilane, N-cyclohexylaminomethylmethyldiethoxysilane, N-cyclohexylaminomethyltriethoxysilane, N-phenylaminomethyltrimethoxysilane, N-cyclohexyl-3-aminopropyltrimethoxysilane, or bis(3-triethoxysilylpropyl)amine.

The adhesive and sealant preparations according to the present invention can also contain, in addition to the aforesaid silylated polyurethane compounds, further adjuvants and additives that impart to these preparations improved elastic properties, improved elastic recovery, a sufficiently long processing time, a fast curing time, and low residual tack. Included among these adjuvants and additives are, for example, plasticizers, stabilizers, antioxidants, fillers, reactive diluents, drying agents, adhesion promoters and UV stabilizers, rheological adjuvants, color pigments or color pastes, and/or optionally also, to a small extent, solvents.

Suitable as plasticizers are, for example, adipic acid esters, azelaic acid esters, benzoic acid esters, butyric acid esters, acetic acid esters, esters of higher fatty acids having approximately 8 to approximately 44 carbon atoms, esters of OH-group-carrying or epoxidized fatty acids, fatty acid esters and fats, glycolic acid esters, phosphoric acid esters, phthalic acid esters, linear or branched alcohols containing 1 to 12 carbon atoms, propionic acid esters, sebacic acid esters, sulfonic acid esters (e.g. Mesamoll, alkylsulfonic acid phenyl ester, Bayer company), thiobutyric acid esters, trimellitic acid esters, citric acid esters, and esters based on nitrocellulose and polyvinyl acetate, as well as mixtures of two or more thereof. The asymmetrical esters of adipic acid monooctyl ester with 2-ethylhexanol (Edenol DOA, Cognis Deutschland GmbH, Düsseldorf), or also esters of abietic acid, are particularly suitable.

Suitable among the phthalic acid esters are, for example, dioctyl phthalate (DOP), dibutyl phthalate, diisoundecyl phthalate (DIUP), or butylbenzyl phthalate (BBP) or their derived hydrogenated derivatives, and among the adipates, dioctyl adipate (DOA), diisodecyl adipate, diisodecyl succinate, or dibutyl sebacate or butyl oleate.

Also suitable as plasticizers are the pure or mixed ethers of monofunctional, linear, or branched $C_{4-16}$ alcohols or mixtures of two or more different ethers of such alcohols, for example dioctyl ether (obtainable as Cetiol OE, Cognis Deutschland GmbH, Düsseldorf).

Particularly preferred, however, are end-capped polyethylene glycols such as dialkyl ethers of polyethylene glycol or of polypropylene glycol, in which the alkyl residue is equal to one to four carbon atoms, in particular the dimethyl and diethyl ethers of diethylene glycol and dipropylene glycol as well as mixtures of two or more thereof. Acceptable curing even under less favorable application conditions (low relative humidity, low temperature) is achieved in particular with dimethyldiethylene glycol. For further details regarding plasticizers, the reader is referred to the relevant chemical engineering literature.

Plasticizers can be additionally used in the preparations at between 0 and 40, by preference between 0 and 20 wt % (based on the entire composition).

"Stabilizers" for purposes of this invention are to be understood as antioxidants, UV stabilizers, or hydrolysis stabilizers. Examples thereof are the commercially usual sterically hindered phenols and/or thioethers and/or substituted benzotriazoles and/or amines of the hindered amine light stabilizer (HALS) type. It is preferred in the context of the present invention if a UV stabilizer that carries a silyl group, and that is incorporated into the end product upon crosslinking or curing, is used. The products Lowilite 75, Lowilite 77 (Great Lakes company, USA) are particularly suitable for this purpose. Benzotriazoles, benzophenones, benzoates, cyanoacrylates, acrylates, sterically hindered phenols, phosphorus, and/or sulfur can also be added. The preparation according to the present invention can contain up to approximately 2 wt %, by preference approx. 1 wt % stabilizers. In addition, the preparation according to the present invention can further contain up to approximately 7 wt %, in particular up to approx. 5 wt % antioxidants.

The catalysts that can be used are all known compounds that can catalyze hydrolytic cleavage of the hydrolyzable groups of the silane groupings, as well as subsequent condensation of the Si—OH group to yield siloxane groupings (crosslinking reaction and adhesion promotion function). Examples thereof are titanates such as tetrabutyl titanate and tetrapropyl titanate, tin carboxylates such as dibutyltin dilaulate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diiosooctylmaleate, dibutyltin ditridecylmaleate, dibutyltin dibenzylmaleate, dibutyltin maleate, dibutyltin diacetate, tin octaoate, dioctyltin distearate, dioctyltin dilaulate, dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters, dibutyltin bisacetylacetonate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo-(5,4,0)-undecene-7 (DBU), a low-molecular-weight polyamide resin obtained from an excess of a polyamine and a polybasic acid, adducts of a polyamine in excess with an epoxy, silane adhesion promoters having amino groups, such as 3-aminopropyltrimethoxysilane and N-(β-aminoethyl)aminopropylmethyldimethoxysilane. The catalyst, preferably mixtures of several catalysts, are used in a quantity from 0.01 to approximately 5 wt % based on the entire weight of the preparation.

The preparation according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 m$^2$/g. When they are used, they do not cause any additional increase in the viscosity of the preparation according to the present invention, but do contribute to strengthening the cured preparation.

It is likewise conceivable to use pyrogenic and/or precipitated silicic acids having a higher BET surface area, advantageously 100 to 250 m$^2$/g, in particular 110 to 170 m$^2$/g, as a filler. Because of the greater BET surface area, the same effect, e.g. strengthening the cured preparation, is achieved with a smaller weight proportion of silicic acid. Further substances can thus be used to improve the preparation according to the present invention in terms of different requirements.

Also suitable as fillers are hollow spheres having a mineral shell or a plastic shell. These can be, for example, hollow glass spheres that are obtainable commercially under the trade names Glass Bubbles®. Plastic-based hollow spheres, e.g. Expancel® or Dualite®, are described e.g. in EP 0 520 426 B1. They are made up of inorganic or organic substances and each have a diameter of 1 mm or less, preferably 500 μm or less.

Fillers that impart thixotropy to the preparations are preferred for many applications. Such fillers are also described as rheological adjuvants, e.g. hydrogenated castor oil, fatty acid amides, or swellable plastics such as PVC. In order to be readily squeezable out of a suitable dispensing apparatus (e.g. a tube), such compositions possess a viscosity from 3000 to 150,000, preferably 40,000 to 80,000 mPas, or even 50,000 to 60,000 mPas.

The fillers are used by preference in a quantity from 1 to 80 wt %, by preference from 5 to 60 wt %, based on the total weight of the preparation.

Examples of suitable pigments are titanium dioxide, iron oxides, or carbon black.

In order to enhance shelf life even further, it is often advisable to further stabilize the preparations according to the present invention with respect to moisture penetration using drying agents. A need occasionally also exists to lower the viscosity of the adhesive or sealant according to the present invention for specific applications, by using a reactive diluent. All compounds that are miscible with the adhesive or sealant with a reduction in viscosity, and that possess at least one group that is reactive with the binder, can be used as reactive diluents.

The following substances can be used, for example, as reactive diluents: polyalkylene glycols reacted with isocyanatosilanes (e.g. Synalox 100-50B, Dow), carbamatopropyltrimethoxysilane, alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforesaid compounds.

Also usable as reactive diluents are the following polymers of Kaneka Corp.: MS S203H, MS S303H, MS SAT 010, and MS SAX 350.

Silane-modified polymers that are derived, for example, from the reaction of isocyanatosilane with Synalox grades can likewise be used.

In the same fashion, the prepolymers according to the present invention can be used in a mixture with usual polymers or prepolymers known per se, optionally with concurrent use of the aforesaid reactive diluents, fillers, and further adjuvants and additives. "Usual polymers or prepolymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforesaid silane-functional reactive diluents have at the same time a drying and/or adhesion-promoting effect in the preparation. These reactive diluents are used in quantities between 0.1 and 15 wt %, by preference between 1 and 5 wt %, based on the entire composition of the preparation.

Also suitable as adhesion promoters, however, are so-called tackifying agents, such as hydrocarbon resins, phenol resins, terpene-phenolic resins, resorcinol resins or derivatives thereof, modified or unmodified resin acids or resin esters (abietic acid derivatives), polyamines, polyaminoamides, anhydrides, and anhydride-containing copolymers. The addition of polyepoxide resins in small quantities can also improve adhesion on many substrates. The solid epoxy resins having a molecular weight of over 700, in finely ground form, are then preferably used for this. If tackifying agents are used as adhesion promoters, their nature and quantity depend on the adhesive/sealant composition and on the substrate onto which it is applied. Typical tackifying resins (tackifiers) such as, for example, terpene-phenolic resins or resin acid derivatives, are used in concentrations between 5 and 20 wt %; typical adhesion promoters such as polyamines, polyaminoamides, or phenolic resins or resorcinol derivatives are used in the range between 0.1 and 10 wt %, based on the entire composition of the preparation.

Manufacture of the preparation according to the present invention occurs in accordance with known methods, by intimate mixing of the constituents in suitable dispersing units, e.g. high-speed mixers, kneaders, planetary mixers, planetary dissolvers, internal mixers, so-called Banbury mixers, double-screw extruders, and similar mixing units known to one skilled in the art.

A preferred embodiment of the preparation according to the present invention can contain:
- 5 to 50 wt %, preferably 10 to 40 wt %, of one or more compounds of the silylated polyurethanes according to the present invention;
- 0 to 30 wt %, preferably less than 20 wt %, particularly preferably less than 10 wt % plasticizer;
- 0 to 80 wt %, preferably 20 to 60 wt %, particularly preferably 30 to 55 wt % fillers.

The embodiment can also contain further adjuvants. The totality of all constituents adds up to 100 wt %; the sum of the principal constituents listed above need not alone add up to 100 wt %.

The silylated polyurethane prepolymers according to the present invention cure with ambient atmospheric moisture to yield low-modulus polymers, so that low-modulus, moisture-curing adhesive and sealant preparations can be manufactured from these prepolymers with the aforesaid adjuvants and additives.

The invention will be further explained in the exemplifying embodiments that follow; the selection of examples is not intended to represent any limitation on the scope of the subject matter of the invention.

EXAMPLES

Example 1 (Comparison)

282 g (15 mmol) polypropylene glycol 18000 (OH no.=6.0) was dried under vacuum at 100° C. in a 500 ml three-neck flask. 0.1 g DBTL was added under a nitrogen atmosphere at 80° C., and 7.2 g (32 mmol) isocyanatopropyltrimethoxysilane (% NCO=18.4) was then added to it. After one hour of stirring at 80° C., the resulting polymer was cooled and had 6 g vinyltrimethoxysilane added to it.

Example 2

Manufacture of a Hydroxy-Terminated Silane (According to the Present Invention)

138 g (11 mmol) propylene carbonate and 220 g (10 mmol) 3-aminopropyltrimethoxysilane (Dynasilan AMMO, Evonik co.) were stirred in a stirring flask for 12 hours at room temperature. A sample examined in an IR spectrometer showed complete reaction of the propylene carbonate, and indicated further processing.

Example 3

Manufacture of a Silylated Polyurethane Prepolymer (According to the Present Invention)

322 g (10 mmol) polypropylene glycol having a molecular weight ($M_n$) of 8000 g/mol was made ready with 16.7 g (24 mmol) TMXDI as a diisocyanate, and converted by tin/bismuth catalysis (Borchikat 22/24) to the NCO-terminated prepolymer at 80° C. The conversion was accomplished with NCO monitoring, and as soon as the theoretical NCO value of the prepolymer had been reached (titrimetrically), 27.8 g of the OH-terminated silane manufactured in Example 2 was metered in, stirring continued for 1 hour, and UV stabilizer and VTMO were added. To check the reaction, the corresponding NCO value was determined; at the end, it was zero.

General Protocol for Manufacturing the Curable Adhesive/Sealant Preparations According to the Present Invention:

25 parts by weight of the polymer mixture manufactured in Examples 1 and 3 were intimately mixed in an agitator vessel, using a SpeedMixer, with 20 parts by weight diisoundecyl phthalate (DIUP).

Into the mixture thereby obtained, 45.05 parts by weight calcium carbonate (Omya 302, "ultrafine ground calcium carbonate"), 3.35 parts by weight stabilized titanium dioxide of the rutile type (Kronos 2056), 1.5 parts vinyltrimethoxysilane ("VTMO", Wacker Geniosil XL10), 0.95 parts by weight 3-aminopropyltrimethoxysilane ("AMMO", Wacker Geniosil GF96), and 0.05 parts by weight dibutyltin laurate were introduced sequentially, and a total of 0.6 parts by weight of a mixture of two aging protection agents were introduced, and the resulting batch was intimately mixed for 30 s in a SpeedMixer.

Test Conditions

The skin-over time (SOT) and complete curing rate (at 23° C., 50% relative humidity in each case) were ascertained for these mixtures. The aforementioned mixtures were also applied, at a layer thickness of 2 mm, onto glass plates over which polyether film had been stretched. After 7 days of storage (23° C., 50% relative humidity), test specimens (S2 test specimens) were punched out of these films and mechanical data (modulus of elasticity at 50, 100% and 200% elongation, elongation at fracture, tensile strength, and recovery characteristics) were determined on the basis of DIN EN 27389 and DIN EN 28339.

The results for the curable adhesive/sealant preparation manufactured according to the present invention are compared, in Table 1 below, with those for a curable adhesive/sealant preparation in accordance with the existing art.

TABLE 1

|  | Example 4 (comparison) | Example 5 (inventive) | Example 6 (inventive) |
| --- | --- | --- | --- |
| Polymer from Example 1 | 25.00 |  | 12.5 |
| Polymer from Example 3 |  | 25.00 | 12.5 |
| DIUP | 20.00 | 20.00 | 20 |
| Omya 302 (ultrafine ground calcium carbonate) | 45.05 | 45.05 | 45.05 |
| Kronos 2056 | 3.35 | 3.35 | 3.35 |
| Tinuvin 327 | 0.30 | 0.30 | 0.30 |
| Tinuvin 770 DF | 0.30 | 0.30 | 0.30 |
| Dynasylan VTMO/Geniosil XL10 | 1.50 | 1.50 | 1.50 |
| Dynasylan AMMO/Geniosil GF96 | 0.95 | 0.95 | 0.95 |
| DBTL (3 drops) | 0.05 | 0.05 | 0.05 |

TABLE 1-continued

| | Example 4 (comparison) | Example 5 (inventive) | Example 6 (inventive) |
|---|---|---|---|
| Results after 7 days | | | |
| SOT (min) (climate chamber) | 25 | 100 | 35 |
| Fracture (N/mm$^2$) | 1.03 | 0.19 | 0.5 |
| Elongation (%) | 188 | 162 | 211 |
| E-50 (N/mm$^2$) | 0.50 | 0.08 | 0.29 |
| E-100 (N/mm$^2$) | 0.68 | 0.16 | 0.46 |
| E-200 (N/mm$^2$) | 1.11 | — | 0.8 |
| Complete curing (mm/24 hr) | 1.95 | 1.65 | 1.9 |
| Elastic recovery (%) | 90 | 90 | 90 |

The preparations according to the present invention of Examples 5 and 6 exhibit a balanced relationship among extensibility (elongation at fracture, in %), very low modulus of elasticity at 50 and 100% elongation (E-100 and E-50) and good elastic recovery (in %). The low modulus is desirable because it would put very little stress on the flank of an expansion gap in the event of thermally or mechanically related movements of a sealed gap.

The invention claimed is:

1. A method for manufacturing a silylated polyurethane, comprising
   (A) reacting
   (i) at least one polyol compound, having a polyoxyalkylene backbone having a number average molecular weight between 8,000 and 20,000 daltons and a polydispersity of less than 2, with
   (ii) a diisocyanate, with a stoichiometric excess of the diisocyanate compound with respect to the OH groups of the polyol compound or compounds, with the result that a polyurethane prepolymer that is isocyanate-terminated is formed; and
   (B) reacting the polyurethane prepolymer with one or more OH-terminated silanes of formula (I):

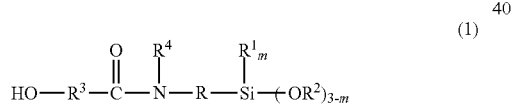

(1)

in which m is equal to 0, 1, or 2, R$^1$ is an alkyl residue having 1 to 4 carbon atoms, R$^2$ is an alkyl residue having 1 to 4 carbon atoms, R$^3$ is a divalent organic residue having 1 to 12 atoms, selected from C, N, S, and/or O, in the chain, R$^4$ is a hydrogen atom or an alkyl residue having 1 to 10 carbon atoms, and R is a Bifunctional organic group, in order to cap the isocyanate groups of the prepolymer with the silane of formula (1).

2. The method according to claim 1, wherein R$^3$ comprises the following structural elements (2):

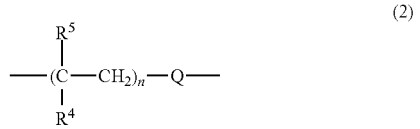

(2)

wherein n is a whole number between 1 and 6,
   Q is N, O, S, a covalent bond, or NR$^4$, and
   R$^4$ and R$^5$ can be, mutually independently, a hydrogen atom or an alkyl residue having 1 to 10 carbon atoms.

3. The method according to claim 1, wherein the silane of formula (1) is manufactured by reacting an aminosilane having primary or secondary amino groups with a carbonate selected from ethylene carbonate, propylene carbonate, butylene carbonate, or a lactone selected from propiolactone, butyrolactone, or caprolactone.

4. The method according to claim 3, wherein the aminosilane is selected from 3-aminopropyltrimethoxysilane, 3-aminopropyltriethoxysilane, N-(n-butyl)-3-aminopropyltrimethoxysilane, 3-aminopropylmethyldimethoxysilane, 3-aminopropylmethyldiethoxysilane, or bis(3-triethoxysilylpropyl)amine.

5. The method according to claim 1, wherein R is a difunctional straight or branched alkylene residue having 2 to 6 carbon atoms.

6. The method according to claim 1, wherein m is zero.

7. The method according to claim 1, wherein m is one.

8. The method according to claim 1, wherein the polyol compound additionally contains at least one compound that is monofunctional with respect to isocyanates, selected from monoalcohols, monomercaptans, monoamines, or mixtures thereof, and the proportion of monofunctional compound is equal to 1 to 40 mol % of the mixture of polyol and the monofunctional compound, and further wherein the stoichiometric excess of the diisocyanate compound with respect to the OH groups of the sum of the polyol compound and said monofunctional compound is from 1.1 to 2.0 such that a polyurethane prepolymer having terminal isocyanate groups is formed in step (A).

9. A silylated polyurethane manufactured using a method comprising
   (A) reacting
   (i) at least one polyol compound, having a polyoxyalkylene backbone having a number average molecular weight between 8,000 and 20,000 daltons and polydispersity of less than 2, with
   (ii) a diisocyanate, with a stoichiometric excess of the diisocyanate compound with respect to the OH groups of the polyol compound or compounds, with the result that a polyurethane prepolymer that is isocyanate-terminated is formed; and
   (B) reacting the polyurethane prepolymer with one or more OH-terminated silanes of formula (1);

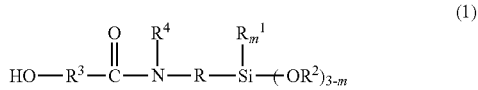

(1)

in which m is equal to 0, 1, or 2, R$^1$ is an alkyl residue having 1 to 4 carbon atoms, R$^2$ is an alkyl residue having 1 to 4 carbon atoms, R$^3$ is a divalent organic residue having 1 to 12 atoms, selected from C, N, S, and/or O, in the chain, R$^4$ is a hydrogen atom or an alkyl residue having 1 to 10 carbon atoms, and R is a difunctional organic group, in order to cap the isocyanate groups of the prepolymer with the silane of formula (1).

10. The silylated polyurethane according to claim 9, wherein $R^3$ comprises the following structural elements (2):

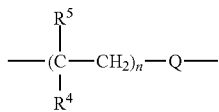
(2)

wherein n is a whole number between 1 and 6,
Q is N, O, S, a covalent bond, or $NR^4$, and
$R^4$ and $R^5$ can be, mutually independently, a hydrogen atom or an alkyl residue having 1 to 10 carbon atoms.

11. The silylated polyurethane according to claim 9, wherein the silane of formula (1) is manufactured by reacting an aminosilane having primary or secondary amino groups with a carbonate selected from ethylene carbonate, propylene carbonate, butylene carbonate, or a lactone selected from propiolactone, butyrolactone, or caprolactone.

12. The silylated polyurethane according to claim 11, wherein the aminosilane is selected from 3-aminopropyltrimethoxysilane, 3-aminopropyltriethoxysilane, N-(n-butyl)-3-aminopropyltrimethoxysilane, 3-aminopropylmethyldimethoxysilane, 3-aminopropylmethyldiethoxysilane, or bis(3-triethoxysilylpropyl)amine.

13. The silylated polyurethane according to claim 9, wherein the polyol compound additionally contains at least one compound that is monofunctional with respect to isocyanates, selected from monoalcohols, monomercaptans, monoamines, or mixtures thereof, and the proportion of monofunctional compound is equal to 1 to 40 mol % of the mixture of polyol and the monofunctional compound, and further wherein the stoichiometric excess of the diisocyanate compound with respect to the OH groups of the sum of the polyol compound and said monofunctional compound is from 1.1 to 2.0 such that a polyurethane prepolymer having terminal isocyanate groups is formed in step (A).

14. The silylated polyurethane according to claim 9, wherein m is zero.

15. The silylated polyurethane according to claim 9, wherein m is one.

16. The silylated polyurethane according to claim 9, wherein the diisocyanate compound is selected from the group made up of 2,4-toluene diisocyanate, 2,6-toluene diisocyanate, 4,4'-diphenylmethane diisocyanate, 2,4'-diphenylmethane diisocyanate, 1-isocyanato-3,3,5-trimethyl-5-isocyanatomethylcyclohexane (isophorone diisocyanate, IPDI), 4,4'-dicyclohexylmethane diisocyanate isomers, tetramethylxylylene diisocyanate (TMXDI), and mixtures thereof.

17. An adhesive, sealant or coating containing one or more silylated polyurethane(s) according to claim 9.

18. The method according to claim 1, wherein the polyoxyalkylene backbone polymers have a polydispersity of less than 1.5.

19. The method according to claim 1, wherein said at least one polyol has a polypropylene backbone.

* * * * *